Dec. 19, 1950     C. H. FLURSCHEIM     2,534,962
RETRACTABLE UNDERCARRIAGE FOR AIRCRAFT
Filed May 30, 1945     3 Sheets-Sheet 1
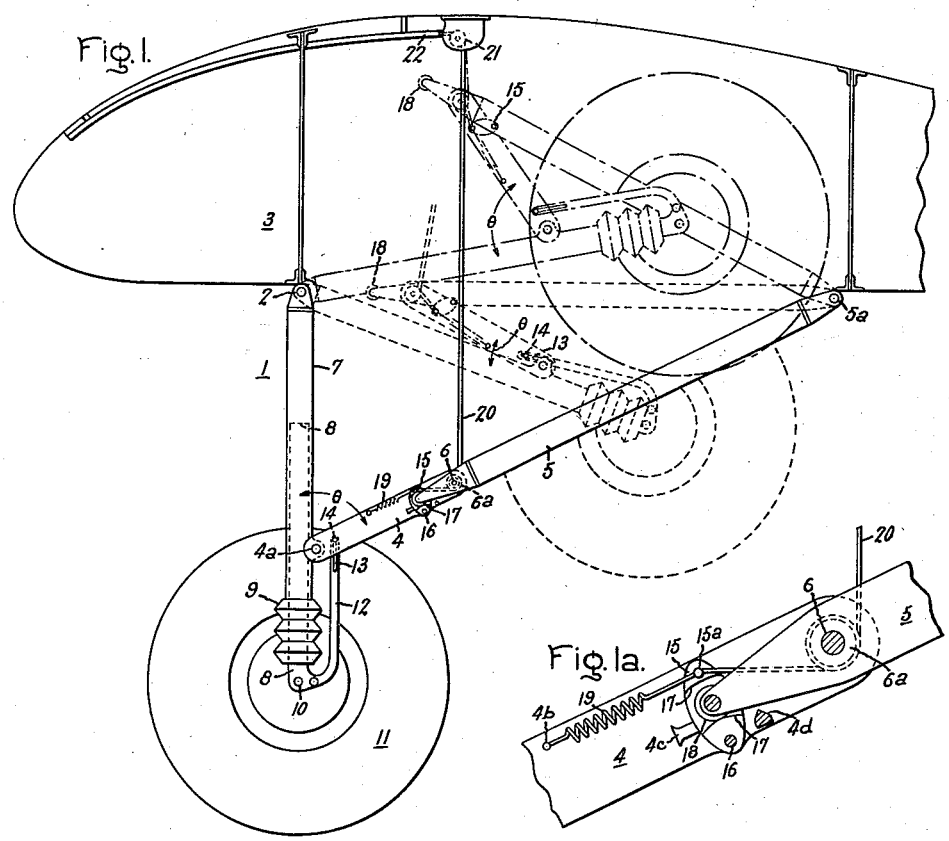
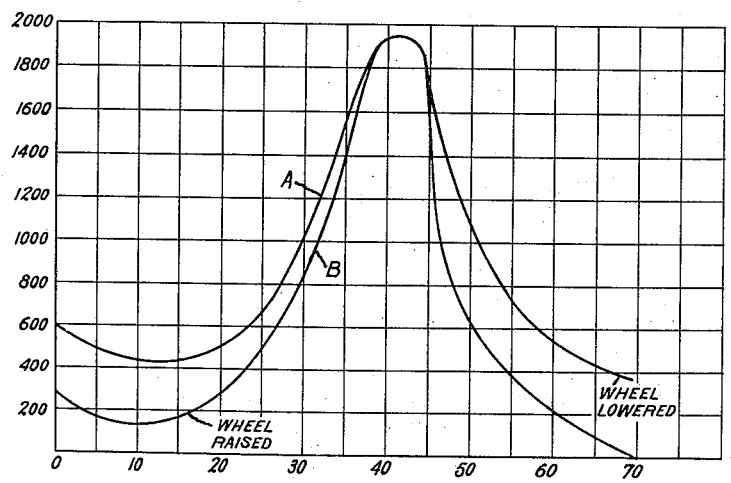
Inventor:
Cedric H. Flurscheim,
by Edwin L. Rich
His Attorney.

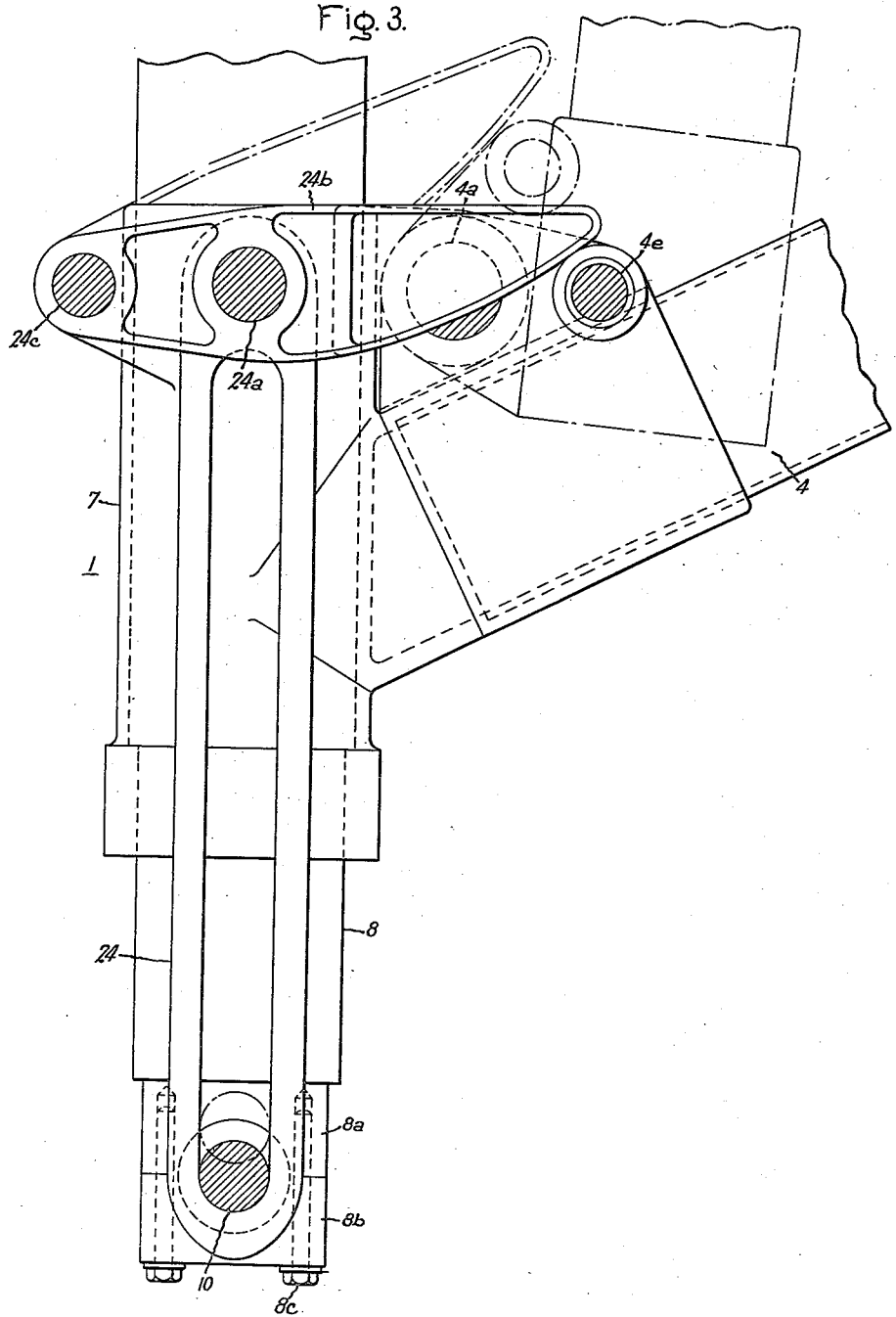

Dec. 19, 1950   C. H. FLURSCHEIM   2,534,962
RETRACTABLE UNDERCARRIAGE FOR AIRCRAFT
Filed May 30, 1945   3 Sheets-Sheet 3
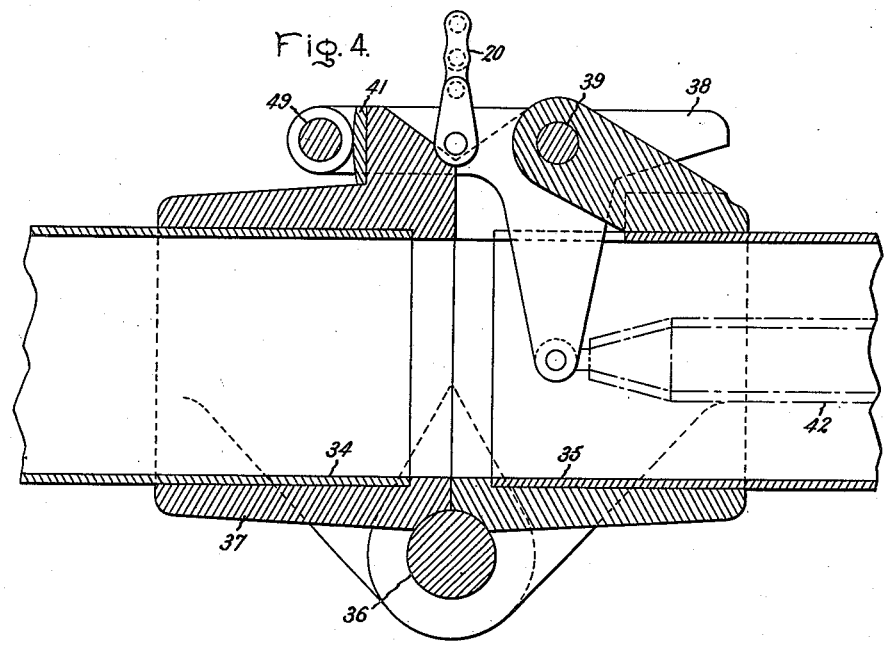
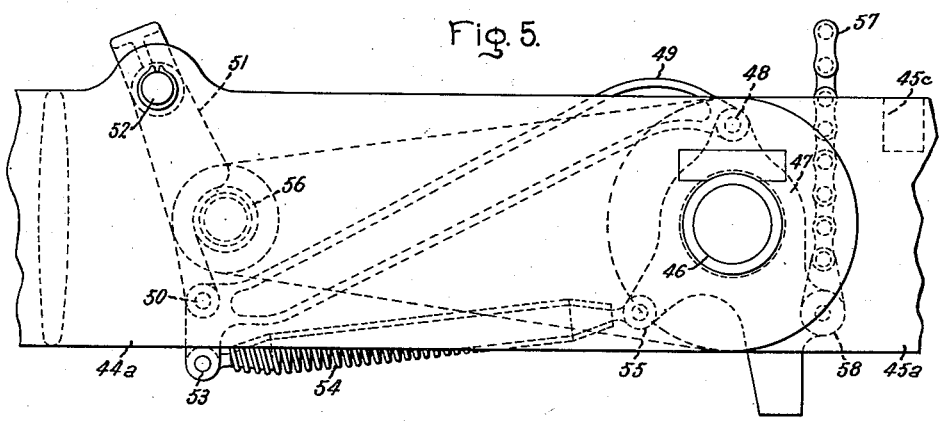
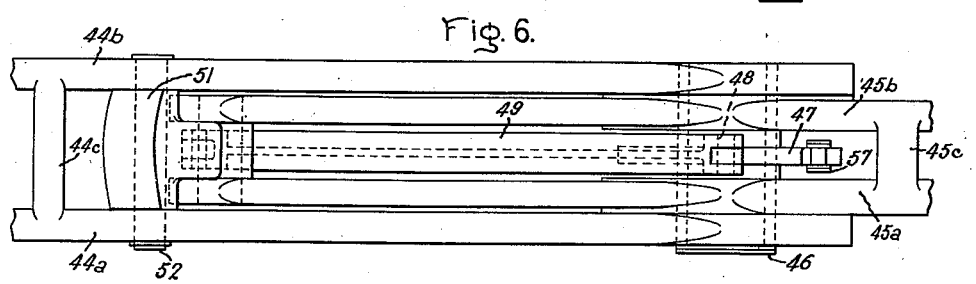
Inventor:
Cedric H. Flurscheim,
by Edwin Z. Rich
His Attorney.

Patented Dec. 19, 1950

2,534,962

UNITED STATES PATENT OFFICE 2,534,962

RETRACTABLE UNDERCARRIAGE FOR AIRCRAFT

Cedric Harold Flurscheim, Bowdon, England, assignor, by mesne assignments, to General Electric Company, a corporation of New York Application May 30, 1945, Serial No. 596,737
In Great Britain October 16, 1941

Section 1, Public Law 690, August 8, 1946
Patent expires October 16, 1961

11 Claims. (Cl. 244—102)

This invention relates to retractable undercarriages for aircraft.

The present invention provides an improved retractable undercarriage for aircraft comprising a pivotal leg for carrying the landing wheel or equivalent landing element, a pair of toggle links for bracing the landing-element-carrying leg in the extended position, an improved form of relatively movable latch mechanism for locking the toggle links in their made, or straightened, position and provided with improved oriented and limited releasing means such as to enable a chain or cable to be interconnected through the agency of said releasing means of the improved latch mechanism with the links and passing over a reversible winch for sequentially effecting release operation of the latch mechanism prior to unstraightening the toggle and then applying tensile force to one of the toggle links for effecting retraction of the undercarriage.

A pair of toggle links for bracing the landing-element-carrying leg may conveniently comprise a relatively long link pivoted to the aircraft, namely to the wing, nacelle or fuselage as the case may be, correspondingly with the landing-element-carrying leg, and a relatively much shorter link pivoted to the landing-element-carrying leg, the chain or cable being conveniently connected by means of the latch mechanism to one of the toggle links so as to apply force for first releasing the latch mechanism prior to breaking the toggle and retracting the undercarriage at or adjacent to the knee joint between the links from a point substantially vertically above said joint in the straightened position of the links.

Preferably the improved latch mechanism is of the eccentric relatively rotatable roller interlocking type and is normally biased, for example by spring means, to the position for locking the toggle links in their straightened position so as to readily snap into interlocking engagement immediately upon the straightening of the toggle links.

Also, it is preferred to connect the chain or cable to the toggle links through the intermediary of the latch releasing mechanism in such manner as to operate the latch for unlocking the toggle prior to applying tensile force for breaking the toggle and then retracting the undercarriage.

It is customary to provide a leg or equivalent for carrying the landing wheel or like element in the form of, or with a component in the form of, a resilient shock absorber, whereby the landing element is adapted to be resiliently sprung. Generally such shock absorber is of the telescopically resilient type, namely comprising a plunger, usually fluid damped, telescoping in a tube wherein it is subjected to the action of high pressure fluid which is permanently sealed in the tube, whereby the axle of the wheel or equivalent landing element is permitted to move a relatively short distance for taking up load when the wheel or like landing element makes contact with the landing surface. In such equipment it has already been proposed to utilise the shock absorber as an energy storing device acting to accumulate energy during the first part of the retraction movement of the undercarriage and to expend such energy during the remaining part of the retraction movement, namely during which the weight of the retractable parts necessitates the application of greater mechanical effort than that required during the aerodynamically-assisted first part of the retraction movement.

In the improved undercarriage of this invention it is preferred to employ a landing-element-carrying leg consisting, at least in part, of a resilient shock absorber, for example of the known telescopically resilient type, for resiliently supporting the landing element, that part of the resilient shock absorber which is resiliently movable with the landing element, relative to the landing-element-carrying leg, or the main part thereof, being connected to said pair of toggle links in such manner as to apply a torque for biasing the toggle links into their straightened position in which they are adapted to be locked by the latch. In a preferred arrangement one of the toggle links for bracing the landing-element-carrying leg is pivoted to the leg, or at least to the part of the shock absorber which is stationery with the leg, or the main part thereof, relatively to the resiliently sprung landing element, and is rotatable about the pivot during the retraction of the leg so that, during application of tensile force by the chain or cable to the toggle links, the angle of inclination of said toggle link with the leg is reduced and thereafter increased and that part of the shock absorber which is movable, with the landing element, relative to the leg, or main part thereof, is connected to said pivoted toggle link, for example by linkage to a point intermediate the pivot between the toggle link and the leg on the one hand and the joint between the toggle links on the other hand, the arrangement being such that energy is accumulated in the shock absorber during the initial part of the retraction movement, namely during reduction of said angle of inclination of the toggle link with the leg, but is expended by the shock absorber in the final part of the retraction movement, namely during increase of said angle of inclination of the toggle link with the leg, for assisting in effecting the retraction movement, and conversely, energy is accumulated in the shock absorber during the initial part, namely whilst the angle of inclination is being reduced, but is expended by the shock absorber during the final part of the extension movement, namely during increase of said angle of inclination, for assisting in rotating the said toggle link into the position in which the toggle links will be locked by the latch. The resiliently sprung part may be connected to one of the toggle links, either directly or through a linkage, so as to enable lost motion between these parts, one of the toggle links being pivotally connected, preferably directly, to the landing-element-carrying leg, or to the part of the shock absorber from which the landing element is adapted to be sprung. Conveniently, the resiliently sprung part may be connected to one of the toggle links by a lost motion device in the form of a pin and slotted link. In a preferred form, however, the lost motion connection comprises a lever movable, through the medium of a link, with the resiliently sprung wheel or like landing element assembly about a fixed pivot and constrained to bear on a projection or roller carried by the said toggle link.

The aforesaid latch may comprise a bell crank lever pivoted to one of the toggle links at a point adjacent the joint with the other toggle link and provided on one arm with a roller adapted to engage with a bearing surface on the other link, whilst its other arm is connected to spring means tending to cause the aforesaid engagement and thereby lock the toggle links in their straightened position. For effecting release of the latch, the aforesaid cable or chain will be conveniently connected to the roller-carrying arm of said lever.

In another form, the latch may comprise a plate pivoted about the axis of the joint between the toggle links and having pivoted to it a spring-pressed substantially tangential link carrying a knuckle-jointed extension which is pivoted to one of the toggle links so as to be capable of embracing a roller carried at, or adjacent, the end of the other link of the toggle. In this form, release of the latch is effected by rotation of the aforesaid plate, as may conveniently be effected by a pull transmitted through the aforesaid cable or chain, which will be appropriately connected to it for this purpose.

If desired, the extension movement of the undercarriage may be assisted by thrust applied to the toggle links through the cable or chain in the manner disclosed in U. S. Patent 2,446,415.

In order that the invention may be fully understood reference will now be made to the accompanying somewhat diagrammatic drawings, in which:

Figure 1 is a side elevation of a retractable undercarriage arranged in accordance with the invention, the undercarriage being shown, in full line, in the fully extended position and, in chain-dotted line, in the fully retracted position, Fig. 1a shows to different scale the means for latching the pair of toggle links of Fig. 1 in their straightened position, Fig. 2 shows typical load curves during retraction of the undercarriage, Fig. 3 is a side elevation, to enlarged scale, of another arrangement, according to the invention, for connecting the landing-element-carrying leg and the bracing toggle linkage, alternative to the form of such connection indicated in Fig. 1.

Fig. 4 is a sectional view, to enlarged scale, of another form of latching means for the toggle linkage alternative to that shown in Fig. 1, and Figs. 5 and 6 are respectively side elevational and plan views of a still further modified form of latching means for the toggle linkage.

Referring first to Fig. 1, there is indicated a wheel-carrying leg 1 pivoted at joint 2 to the wing, nacelle or fuselage of the aircraft represented generally at 3, so that the leg is retractable by swinging backwards about the pivot 2. The leg 1 is adapted to be braced in the extended position shown, by a toggle strut comprising a short toggle link 4 and a relatively much longer toggle link 5 pivoted together at 6, the shorter link 4 being further pivoted at 4a to the leg 1 and the longer link 5 at 5a to the wing, nacelle or fuselage 3, to the rear of, and in substantially horizontal alignment with, the pivot 2 of the leg 1.

The leg 1 is in the known form of telescopically resilient shock absorber comprising a tubular part 7 and a plunger or equivalent member 8 telescoping within the tube 7 and subjected, within said tubular part, to the action of high pressure oil or other damping fluid which is permanently sealed within the tube 7. The telescoping part 8 extends from the tubular part 7 through a hermetic sealing and dust-preventing means represented generally at 9 and its protruding end is arranged to support the axle 10 of the landing wheel 11. The travel of the plunger 8 will be limited by positive stops (not shown), the permitted movement of said plunger enabling the landing wheel 11 to move a few inches in the axial direction of the leg 1 as the load is taken up by the wheel 11 at contact with the ground or other landing surface.

It will be appreciated that the leg 1 and bracing toggle strut 4, 5 may form the only support for the landing wheel 11 or there may be two such legs and bracing struts astride the wheel, according to circumstances. Likewise, there may be one such leg and bracing strut or pair thereof for each landing wheel or pair of landing wheels. In other words, the leg 1, bracing strut 4, 5 and landing wheel 11 may constitute the aircraft undercarriage or co-operate with one or more sets of corresponding parts to constitute the undercarriage, according to circumstances.

The plunger 8, at the part where it protrudes from the tube 7, has pivoted to it a link 12 having a longitudinal slot 13 in which engages a pin 14 secured to the shorter toggle link 4. In the fully extended position shown, the pin 14 rests at the upper end of the slot 13. However, on contact between the wheel 11 and the landing surface, the wheel 11 and plunger 8 will move upwardly against the action of the pressure fluid in the tube 7, the pin 14 riding along the slot 13 into an intermediate position therein.

As shown more clearly in Fig. 1a, the toggle links 4 and 5 are adapted to be latched in the straightened position shown by means of a latch lever 15 pivoted at 16 to the link 4 and having curved surfaces 17 projecting in the axial direction of the part 16 for engaging a roller 18 secured to the free end of the longer toggle link 5. The latch 15 is biased into the latching position shown, namely in which the roller 18 is disposed between the surfaces 17, by means of biasing spring 19 extending between a pin 15a on the latch lever 15 and a pin 4b on the toggle link 4, said latch being held against stop 4c by means of spring 19.

For the purpose of unlatching the latch 15 and applying force to break the toggle strut 4, 5 and to retract the undercarriage, a cable or chain member 20 passing round a roller 6a on pivot 6 at the knee of the toggle is carried upwardly over a sprocket 21 pivotally mounted to the wing or like part 3, substantially vertically above the toggle pivot 6, the tail of the cable or chain 20 being then accommodated in a guide 22, suitably secured to the wing or like part 3. The sprocket 21 is adapted to be rotated by means (not shown) such for example as an electric motor. In this instance, the cable or like part 20, after passing round the roller 6a at the toggle pivot 6, is attached to pin 15a on the latch 15.

With the arrangement described, when the sprocket 21 is driven in the appropriate direction, the initial effect of the pull transmitted through the cable or chain 20 is to rotate the latch 15 against the bias of spring 19 into position to free from the surfaces 17 the toggle-carried roller 18. Thereafter the continued pull is effective to break the toggle linkage 4, 5 and, with the toggle folding up, swing the landing wheel leg 1 and landing wheel 11 rearwards and upwards into the stowed or fully retracted position shown in chain-dotted line, in which position the undercarriage will be held by suitable locking of the sprocket 21 against rotation. When the sprocket is released and allowed to rotate in the opposite direction, or when driven in such opposite direction, the toggle linkage 4, 5 will unfold and the landing leg 1 and landing wheel 11 will swing downwardly and forwardly into the position shown, with over-travel of link 5 prevented by abutment 4d.

The slotted link 12, 13 and the pin 14 enables lost motion between the plunger 8, and thus the landing wheel 11, on the one hand and the toggle link 4 on the other hand, for enabling their relative movement under landing loads.

During retraction of the undercarriage caused, as described, by the exertion of a pull on the knee joint 6 of the toggle linkage 4, 5, the angle θ between the toggle link 4 and the wheel-carrying leg 1 is continuously reduced and, after the lost motion between these parts has been taken up, namely while the pin 14 is riding along the slot 13 from the intermediate position which it occupies with the landing wheel 11 in contact with the landing surface to the end position shown, which it occupies when the landing wheel is just out of contact with the landing surface, the plunger 8 is accordingly constrained to telescope further into the tube 7 against the action of the pressure fluid therein. Such movement of the plunger 8 produces corresponding increase in the pressure of the fluid trapped between the plunger 8 and the tube 7. Thus, during this part of the retraction movement, energy is stored up in the telescopically resilient shock absorber constituted by the leg 1. At an intermediate stage of the retraction of the undercarriage, the angle θ becomes reduced almost to zero, corresponding to the toggle link 4 becoming substantially aligned with the wheel-carrying leg 1; at this stage the telescopic movement of the plunger 8 into the tube 7 ceases. The relative positions of the plunger 8 and landing wheel 11 and the toggle linkage at this stage are shown in broken line in the drawing. Continued pulling on the knee joint 6 of the figure will result in the toggle link 4 swinging about its pivot 4a in the opposite direction, that is, the angle θ will correspondingly increase until the undercarriage arrives in the stowed-away position indicated in chain-dotted line; during this, the final part of the retraction of the undercarriage, the plunger 8, under the constraint imposed on it by the high fluid pressure in the tube 7, moves outwardly from the tube. That is to say, whereas energy is stored in the telescopically resilient shock absorber 1 during the initial part of the retraction of the undercarriage, such stored energy is expended by the shock absorber during the final part of the retraction movement. This expenditure of energy during the final part of the retraction movement is effectual to assist in the retraction movement and thus to reduce the load on the driving means for the sprocket 21, a feature which is especially desirable since, during this part of the retraction, greater load would otherwise be imposed on the driving means by reason of the reduced aerodynamic effect tending to retract the undercarriage, which reduction is occasioned in consequence of the reduction in the effective area of the undercarriage which is exposed.

Conversely, during the initial part of the extension movement of the undercarriage, the relative movement of the toggle linkage 4, 5 and the wheel-carrying leg 1, namely with angle θ decreasing, will have the effect of forcing the plunger 8 further into the tube 7 and so increasing the pressure of the trapped fluid. When the toggle link 4 swings into the position in which it is substantially in alignment with the leg 1, that is with the angle θ at its minimum value, the telescopic movement of the plunger 8 ceases and thereafter the plunger 8 is forced by the trapped pressure fluid to move further out from the tube 7. Thus, whereas energy is accumulated in the telescopically resilient shock absorber 1 during the initial part of the extension of the undercarriage, namely with the angle θ decreasing, this energy is expended by the shock absorber during the final part of the extension movement, namely with the angle θ increasing. As will be appreciated, by virtue of the energy accumulated in the shock absorber during the initial part of the extension movement, torque is applied through the link 12 to the toggle link 4 during the final part of the extension movement, such torque being in the direction tending to restore the toggle 4, 5 into the straightened position in which it will become locked by the latch 15. Thus, the latching torque acting on the toggle is not only maintained but is actually increased as the extension of the undercarriage progresses.

The operation is further illustrated by reference to the typical load curves shown in Fig. 2 for a specific example in which the landing wheel weight is of the order of 500 pounds and the force exerted by the wheel struts in the extended condition is of the order of 7,500 pounds weight. In this figure, abscissa represent extent of travel of the lifting cable in inches, this value being zero when the landing wheel is in the fully stowed-away or retracted position, and maximum with the wheel in the fully lowered position, corresponding to the undercarriage being fully extended, whilst ordinates represent values of pull in pounds weight exerted in the lifting cable during movement of the landing wheel from the fully lowered to the fully raised position. The curve A represents the actual load, that is the force exerted in the cable, throughout the wheel raising operation, whilst the curve B represents the force required in the cable merely to overcome the weight of the wheel, so that the area between the curves A and B, for the higher values of travel of the lifting cable, represents the work done in compressing the telescopically resilient shock absorber whilst the area between these curves for the lower values of travel of the lifting cable represents the work done in effecting extension of the undercarriage by expansion of the telescopically resilient shock absorber.

In the modification shown in Fig. 3, in which parts corresponding to those appearing in Fig. 1 are referred to with like reference characters, the wheel-carrying leg 1 is shown as comprising a tubular part 7 and a telescoping part 8 which, as in the previously described arrangement, will be subjected within the tube 7 to the action of pressure fluid. At 10 is indicated the landing wheel axle, being herein shown as mounted in a bearing comprising a half-block 8a attached to the telescoping part 8 and half-block 8b connected to the half-block 8a by means of studs 8c. As in the previously described arrangement, the wheel axle 10 is thus movable with the telescoping part 8 relatively to the tube 7, and the landing wheel is accordingly resiliently sprung by the telescopically resilient shock absorber constituted by the wheel-carrying leg 1. In this embodiment, however, the wheel axle 10 rides in a slotted link 24 which extends side by side with the leg 1 and carries, at its upper end, an intermediate pivot 24a for a lever 24b which is also pivoted at 24c to the tubular part 7. The other end of the lever 24b rests in contact with a roller 4e carried by the shorter toggle link 4 which is pivoted to the tube 7 at 4a and is adapted to brace the leg 1 in the extended position as in the embodiment previously described with reference to Fig. 1.

With the modified arrangement of Fig. 3, the lever 24b is constrained to bear upon the roller 4e in the fully extended position of the wheel-carrying leg 1 shown, by reason of the action of the trapped pressure fluid on the part 8 and thus the wheel axle 10. However, during movement of the toggle link 4 in the direction of collapse of the toggle, as represented in chain-dotted line, the lever 24b is tilted upwardly drawing the wheel axle 10 into the chain-dotted position accordingly to cause the part 8 to telescope into the tube 7 and further to compress the trapped fluid. Conversely, when the toggle link 4 swings in the direction for making the toggle, the pressure fluid, in forcing the part 8 further out of the tube 7, is enabled, through the resultant displacement of lever 24b, to exert torque on the toggle link 4 in the direction tending to latch the toggle.

According to the modification shown in Fig. 4, the toggle strut for bracing the wheel-carrying leg 1 of the undercarriage of Fig. 1 comprises two links in the form of tubes 34 and 35, corresponding respectively to the short and longer toggle links 4 and 5 of Fig. 1, having a pivoted joint 36 carried by housing 37 for the tube 34. In order to latch the tubes 34 and 35 in the position shown, which is that for the fully extended position of the undercarriage, there is provided a latch in the form of bell-crank lever 38 pivoted at 39 to the longer toggle link 35 and carrying, on one of its arms, a roller 40 for engaging a cam surface 41 on the housing 37 fast to the toggle link tube 34. The latch is biased into the latching position shown by means of spring 42 secured, at one end, to the other arm of the bell-crank latching lever 38 and arranged to be secured, at its other end, to the longer toggle link tube 35. In this embodiment, the latching lever 38 is adapted to be rocked to carry the roller 40 away from the cam 41 so as to release the latch, and the toggle link thereafter broken for retracting the undercarriage by pull exerted in a cable or chain 20, corresponding to the cable or chain 20 of Fig. 1. In other respects the arrangement is similar to that shown in Fig. 1.

In the modification shown in Figs. 5 and 6, the toggle strut comprises two links, one in the form of a pair of bars 44a and 44b each of elliptical cross-section braced by cross member 44c, and the other in the form of a pair of bars 45a and 45b of like elliptical cross-section braced by cross-member 45c, the former corresponding to the short link 4 and the latter to the longer link 5 of Fig. 1. The shorter link 44a—c is pivoted to the longer link 45a—c by means of pivot pin 46, the pivot being adjacent the end of the short link but some distance from the end of the longer link. A plate 47 rides on the pivot pin 46, midway between the bars forming the respective links 44a—c and 45a—c. Pivoted to the plate 47 at 48 is a substantially tangentially disposed link 49. This link 49 is pivoted at 50 to a knuckle-jointed extension 51 which is also pivoted at 52 to the short toggle link 44a—c. The link 49 is also connected at 53 to one end of a spring 54 whose other end is pivoted at 55 to the plate 47, so that the link 49 is biased into the position shown in which the knuckle-jointed extension 51 substantially embraces a roller 56 carried on the free end of the longer toggle link 45a—c, corresponding to the toggle being made and latched, and the undercarriage thus locked in the fully extended position. A cable or chain 57, corresponding to the like part in Fig. 1 is secured to the plate at 58 namely in position such that, when a pull is exerted on the cable or chain 57, the plate 47 is rotated in the direction to swing the knuckle-jointed extension about its pivot 52 against the biasing action of spring 54 for disengaging the roller 56 and thereafter breaking the toggle for retracting the undercarriage.

What I claim as new and desire to secure by Letters Patent of the United States is:

1. A retractable undercarriage for aircraft having in combination a landing wheel having a pivoted supporting leg for carrying said landing wheel between a retracted position and an extended position, means including a pair of toggle links connected by a knee joint and having pivotal connections at their extremities to said leg and to an aircraft respectively to brace said leg against that aircraft when extended to a straightened position, said links having relatively movable interlock members carried thereby into interlocking engagement for locking said links in said straightened position, oriented releasing means including a winch having a flexible tensile element connected with one of said interlock members for effecting an unlocking relative movement thereof and means for limiting said unlocking relative movement to cause said tensile element to apply a lifting force to the knee joint of said toggle links to unstraighten said toggle links and pull said leg and said landing wheel to the completely retracted position.

2. A retractable undercarriage according to claim 1 wherein said toggle links for bracing said leg comprise a relatively long link provided with pivotal connections adapted for pivoting said long link to an aircraft body and a relatively short link pivotedly connected to said leg, said tensile element having means for providing a concentric connection with the axis of the knee joint of said toggle links to apply tensile force to said knee joint from a point substantially vertically above said joint.

3. A retractable undercarriage according to claim 1 wherein said one of said relatively movable interlocking members is provided with spring biasing means for biasing said member to a predetermined locking position in the path of the other member for automatically interlocking therewith with a snap action whenever said toggle links move to said straightened position.

4. A retractable undercarriage according to claim 1 wherein said relatively movable interlock members are disposed remotely from the knee joint between said toggle links and provided with unlocking means including a rotatable member concentric with said knee joint, and said tensile element is connected with said rotatable member for effecting an unlocking limited relative rotation thereof for unlocking said interlock members prior to applying tensile force to said knee joint to unstraighten said links and pull said leg and said landing wheel to said retracted position.

5. A retractable undercarriage for aircraft having in combination a landing wheel assembly, a pivoted supporting leg for carrying said landing wheel assembly between a retracted position and a downwardly extended position, a resilient shock absorber for mounting said landing wheel assembly at the free end of said leg for downwardly biased movement relative to said leg, means including a pair of toggle links connected by a knee joint and having pivotal connections at their extremities to said leg and to an aircraft respectively to brace said leg against that aircraft when extended to a straightened position, one of said links having a connection to said landing wheel assembly for biasing said toggle links toward said straightened position upon downward movement of said wheel, said links having relatively movable interlock members carried thereby into interlocking engagement for locking said links in said straightened position, and means including a winch having a flexible tensile element connected with one of said interlock members for effecting an unlocking limited relative movement thereof, and thereafter applying tensile force to one of said toggle links to unstraighten said toggle links and pull said leg and said landing wheel to said retracted position against the bias of said shock absorber.

6. A retractable undercarriage according to claim 5 wherein said one of said toggle links for bracing said landing wheel carrying leg is pivoted to said leg so that during application of tensile force by said tensile element, the angle of inclination between said one of said toggle links and said leg is progressively reduced and then increased whereby energy is accumulated in said shock absorber during the initial part of said retraction movement and is expended by said shock absorber in the final part of said retroaction movement and conversely energy is accumulated in said shock absorber in the initial part of the extension movement of said leg and expended in the final part of said extension movement for assisting in rotating said toggle links into said straightened position thereof in which said toggle links are locked by said interlocked members.

7. A retractable undercarriage according to claim 5 wherein said connection between said one link and said shock absorber is of the lost motion type to provide freedom of movement of said wheel when said wheel is in the extended position.

8. A retractable undercarriage according to claim 5 wherein said connection is of the pin and slotted link type for providing freedom of movement of said wheel when said wheel is in the extended position.

9. A retractable undercarriage according to claim 5 wherein said one link carries a roller and said connection further comprises a cam lever pivotally mounted on said leg and means for connecting said cam lever to said shock absorber in such a manner that during transition of the leg from the retracted to the extended position, said roller biases said cam lever against the resistance of said shock absorber.

10. A retractable undercarriage for aircraft having in combination a landing wheel having a pivoted supporting leg for carrying said landing wheel between a retracted position and an extended position, means including a pair of toggle links connected by a laterally offset knee joint and having pivotal connections at their extremities to said leg and to an aircraft respectively to brace said leg against that aircraft when extended to a straightened position, one of said links having a bell-crank lever pivoted thereto at a point opposite said knee joint and provided on one arm with a roller the other of said links having a curved bearing surface provided thereon to be engaged by said roller upon straightening of said links, spring means connected with the other arm of said bell-crank for biasing said roller to a position for engaging said surface and thereby interlocking said roller with said surface to lock said links in said straightening position, and means including a winch having a flexible tensile element connected with said bell-crank lever for effecting an unlocking limited relative rotation thereof against the bias of said spring and thereafter applying tensile force to one of said toggle links to unstraighten said toggle links and pull said leg and said landing wheel to said retracted position.

11. A retractable undercarriage for aircraft having in combination a landing wheel having a pivoted supporting leg for carrying said landing wheel between a retracted position and an extended position, means including a pair of toggle links connected by a knee joint and having pivotal connections at their extremities to said leg and to an aircraft respectively to brace said leg against that aircraft when extended to a straightened position, a plate rotatable about the axis of the knee joint of said toggle links, one of said links having an extension beyond said axis and provided with a roller at the end of said extension, a knuckling extension pivoted to the other of said toggle links and provided with a curved surface for embracing said roller when said toggle links are in said straightened position, a thrust link interconnecting said plate and said knuckling extension, spring means for biasing said plate to move said knuckling extension to a position for interlocking engagement with said roller to lock said links in said straightening position, and means including a winch having a flexible tensile element connected with said plate for effecting an unlocking limited relative rotation thereof and thereafter applying tensile force to said joint between said links to unstraighten said links and pull said leg and said landing wheel to said retracted position.

CEDRIC HAROLD FLURSCHEIM.

REFERENCES CITED

The following references are of record in the file of this patent:

UNITED STATES PATENTS

| Number | Name | Date |
| --- | --- | --- |
| 1,329,533 | McCarrol | Feb. 3, 1920 |
| 1,857,888 | Stout | May 10, 1932 |
| 2,422,577 | Martin | June 17, 1947 |

FOREIGN PATENTS

| Number | Country | Date |
| --- | --- | --- |
| 408,435 | Great Britain | Apr. 12, 1943 |
| 520,994 | Great Britain | May 9, 1940 |
| 611,733 | Germany | Apr. 4, 1935 |